United States Patent Office 2,715,060
Patented Aug. 9, 1955

2,715,060

PROCESS OF MAKING SILICA

Arthur J. Barry, Midland, Mich., assignor to Dow Corning Corporation, Midland, Mich., a corporation of Michigan No Drawing. Application October 31, 1951,
Serial No. 254,201

1 Claim. (Cl. 23—182)

This invention relates to a process of making finely divided siliceous material.

Two general methods are employed to produce finely divided synthetic silica. These are the fume process in which a volatile silane is burned and an organo gel technique in which a silica hydrogel is converted into an organo gel and the organic solvent is thereafter removed either below its critical temperature to give a so-called xerogel or above its critical temperature to give a so-called aerogel. It is not possible by a fume process to introduce pyrophoric groups directly upon the silicon. The organogel techniques involve the use of organic solvents and oftentimes expensive pressure equipment.

It is the object of the present invention to provide a simple, economical method for preparing finely divided silicas which will obviate the necessity of the use of solvents and which allows the production of hydrophobic silicas.

In accordance with this invention, silicon tetrachloride is reacted with water at a temperature of at least 300° C. in the ratio of at least 2 mols of water per mol of silicon tetrachloride.

In addition, one may employ a mixture of silicon tetrachloride with a silane of the group trichlorosilane and organosilanes of the formula $R_nSiX_{4-n}$ in which R is an akyl radical of less than 7 carbon atoms or a monocyclic aryl radical and $n$ has a value from 1 to 3, and X is a hydrolyzable unit of the group Cl and alkoxy radicals of less than 7 carbon atoms such as methoxy, ethoxy and hexyloxy radicals. When such silanes are employed, the mixture should have at least 25 mol per cent silicon tetrachloride. If less than that amount of silicon tetrachloride is employed, hard, horny gels will result upon hydrolysis.

The molar ratio of water to silanes in the reaction should be such that there is at least enough water to react with all of the chlorine and alkoxy (i. e. there should be at least one molecule of water for each two hydrolyzable silane units). The term hydrolyzable silane units has reference to the chlorine atoms and alkoxy radicals. Preferably, the amount of water should be in the range of at least 5 mols of water per mol of silane. In those cases in which the amount of water falls below that sufficient to remove the chlorine or alkoxy radicals, the resulting product is not desirable. There is no upper limit to the amount of water which may be employed, although obviously when the ratio of water to silane becomes excessive, the efficiency of the process is correspondingly reduced.

The organochlorosilanes employed herein are those in which the R groups are alkyl radicals of less than 7 carbon atoms such as ethyl, methyl, propyl, butyl, isopropyl, tertiary butyl and the like or monocyclic aryl radicals such as phenyl, tolyl, xylyl and the like. In addition, the mixture may contain, in lieu of the above organosilanes, trichlorosilane. When this material is employed in conjunction with the silicon tetrachloride, surprisingly enough, all of the hydrogen is not removed even under the drastic conditions of the reaction. The resulting powder, however, is hydrophilic in nature. When the defined organosilanes are employed the silica powder is hydrophobic.

The reaction of this invention should be carried out at a temperature of at least 300° C. Below this temperature satisfactory silicas are not obtained. The upper limit of the temperature is not critical; however, for all practical purposes temperatures in excess of 800° C. are not beneficial. The reaction may be carried out in any convenient manner but the preferred method is to preheat the reactants separately to at least 300° C. before introducing them into the reaction zone. In the reaction zone, the temperature is also maintained at or above 300° C. Under such conditions, the reaction occurs between individual molecules of water and the silanes. This produces a condensate which is composed of exceedingly fine particles of $SiO_2$. The particle size is not affected appreciably by the introduction of organo groups. In cases where the organochlorosilanes or trichlorosilane are employed, the finely divided silica will also contain silicon bonded alkyl or phenyl groups or hydrogen atoms.

The reaction may be carried out in any convenient apparatus. One such apparatus which has proved satisfactory consists in passing the water and chlorosilanes separately through two tubes which are heated to the specified temperature. The pre-heated reactants are then passed into the reaction chamber which is heated. A thermocouple is placed in the reaction chamber to control the temperature. The effluent silica is then passed into a cooling chamber where it is collected. Any convenient method of collecting may be employed.

The materials of this invention are useful in the reinforcing of rubbers and in those applications in which a hydrophobic silica is of advantage. For example, they may be employed as a filler in life rafts or life belts. In such applications, the hydrophobed silicas are of prime importance since they do not become waterlogged.

The following examples are illustrative only and should not be construed as limiting the scope of the invention which is properly set forth in the appended claims.

EXAMPLE 1

69,398 grams of silicon tetrachloride and 88,640 grams of water were pre-heated separately to 600° C. and then reacted at that temperature. The water and silane were added to the reaction zone over a period of 12 hours. The resulting product was a wettable silica powder having an average particle size of .3 micron.

EXAMPLE 2

570 grams of silicon tetrachloride and 2950 grams of water were pre-heated separately at 300° C. and then reacted at that temperature. The water and silane were added to the reaction zone over a period of 5 hours. The resulting product was a silica powder having an average particle size of 0.2 micron.

EXAMPLE 3

A series of reactions was carried out employing the reactants shown below in the amounts specified. In each case, the mixed silanes and water were pre-heated separately to 630° C. and then reacted at that temperature. In each case except where $HSiCl_3$ and $SiCl_4$ were used, the resulting silica was hydrophobic.

Table I

| Amount of $SiCl_4$ in G. | Other Silane | Amount of Other Silane in G. | Amount of $H_2O$ in G. | Time of Addition in Hrs. | Average Particle Size of $SiO_2$ in Microns |
|---|---|---|---|---|---|
| 1,530 | $(CH_3)SiCl_3$ | 1,350 | 4,250 | 6 | 0.56 |
| 1,530 | $HSiCl_3$ | 1,224 | 3,600 | 5.75 | .69 |
| 1,360 | $C_6H_5SiCl_3$ | 1,496 | 5,100 | 6.75 | .85 |
| 2,040 | $(CH_3)_2SiCl_2$ | 774 | 4,300 | 6 | .81 |
| 2,040 | $CH_3Si(OC_2H_5)_3$ | 712 | 5,000 | 6.5 | .58 |
| 2,040 | $(CH_3)_3SiOC_2H_5$ | 472 | 3,750 | 2 | .48 |
| 1,530 | $C_2H_5SiCl_3$ | 492 | 2,400 | 4.5 | .78 |

That which is claimed is:

A method of preparing a hydrophobic silica which comprises reacting a mixture of silicon tetrachloride and a silane selected from the group consisting of trichlorosilane and organosilanes of the formula $R_nSiX_{4-n}$ in which R is selected from the group consisting of alkyl radicals of less than 7 carbon atoms and monocyclic aryl radicals, X is selected from the group consisting of chlorine and alkoxy radicals of less than 7 carbon atoms and $n$ has a value of from 1 to 3, in said mixture there being at least 25 mol per cent silicon tetrachloride, with water at a temperature of at least 300° C., the ratio of reactants being such that the water is present in amounts of at least 1 molecule per 2 hydrolyzable silane units.

References Cited in the file of this patent

UNITED STATES PATENTS

| | | |
|---|---|---|
| 1,451,399 | Low | Apr. 10, 1923 |
| 2,269,059 | McLachlan | Jan. 6, 1942 |
| 2,474,704 | Thayer | June 28, 1949 |
| 2,535,036 | Broughton | Dec. 26, 1950 |
| 2,556,462 | Barry | June 12, 1951 |

FOREIGN PATENTS

| | | |
|---|---|---|
| 572,230 | Great Britain | Aug. 29, 1945 |
| 575,696 | Great Britain | Feb. 20, 1946 |
| 633,732 | Great Britain | Dec. 19, 1949 |
| 635,645 | Great Britain | Apr. 12, 1950 |

OTHER REFERENCES

Mellor: "Inorganic and Theoretical Chemistry," vol. 6, Longmans, Green and Co., N. Y. (1925), page 964.

Langes: Handbook of Chemistry, 5th edition, Handbook Pub. Inc., Sandusky, Ohio (1944), page 858.